Dec. 28, 1943.    T. P. SIMPSON ET AL    2,338,063
METHOD FOR CONVERTING HYDROCARBON OILS
Filed April 13, 1940    2 Sheets-Sheet 1
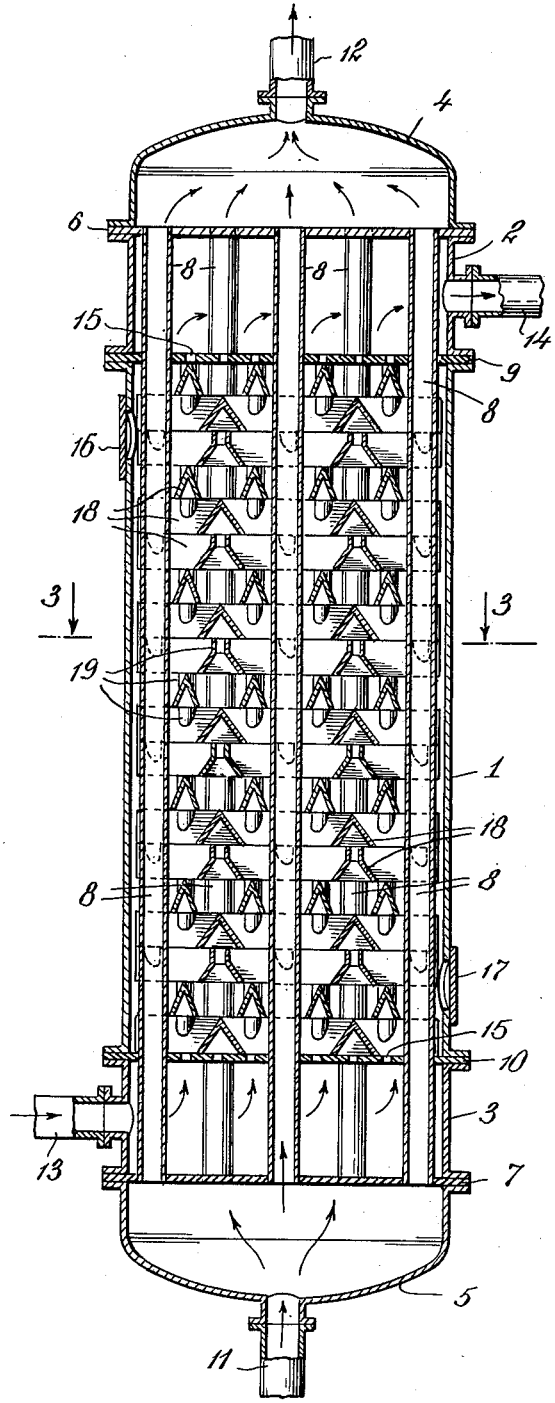
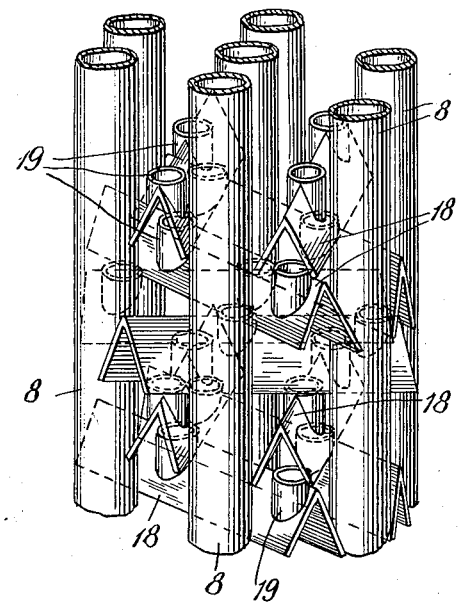
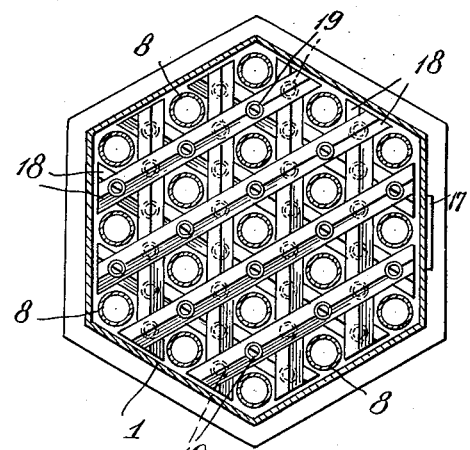
Clark S. Teitsworth
Thomas P. Simpson,
John W. Payne, and
John A. Crowley, Jr.
INVENTORS
BY
ATTORNEY Dec. 28, 1943.   T. P. SIMPSON ET AL   2,338,063
METHOD FOR CONVERTING HYDROCARBON OILS
Filed April 13, 1940   2 Sheets-Sheet 2
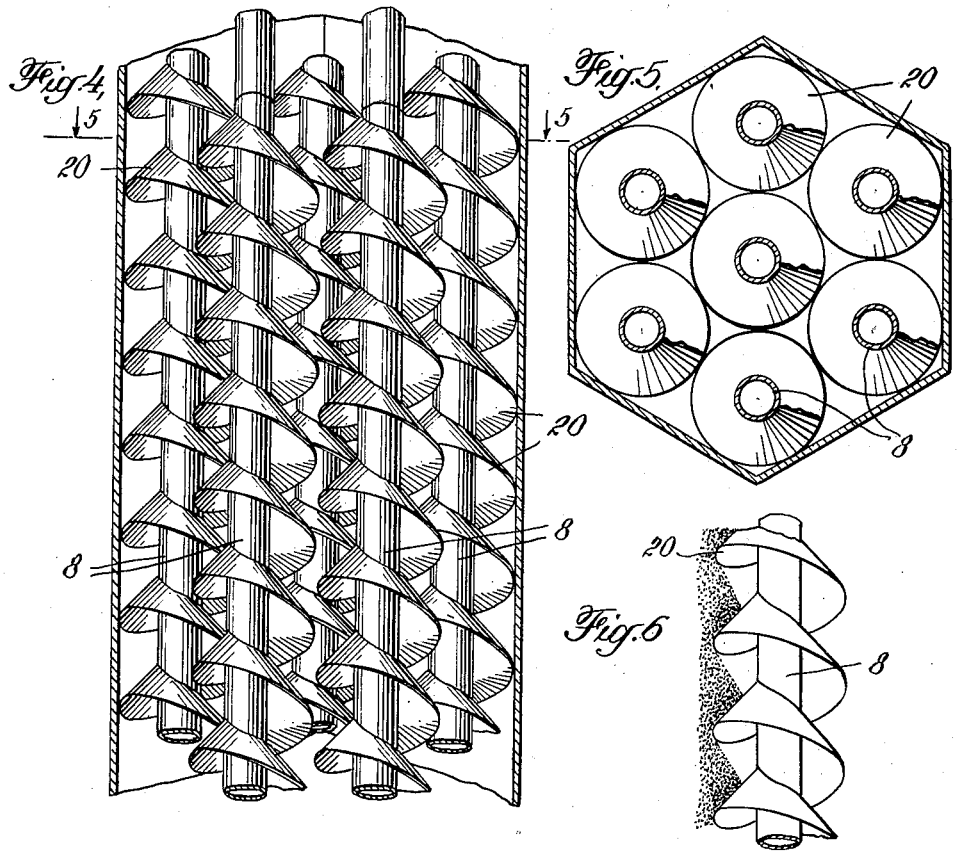
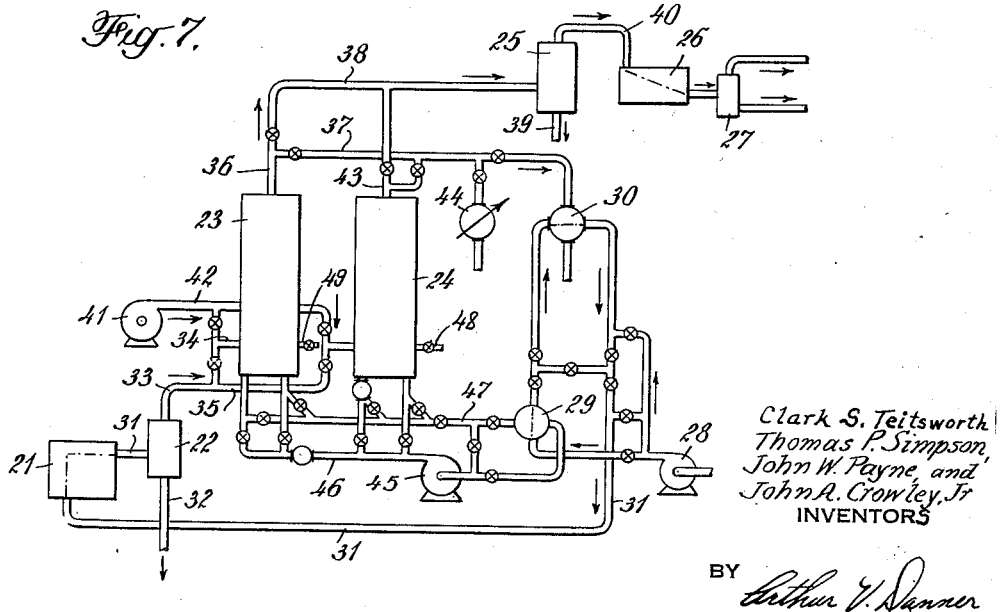
Clark S. Teitsworth
Thomas P. Simpson,
John W. Payne, and
John A. Crowley, Jr.
INVENTORS
BY
Arthur V. Danner
ATTORNEY Patented Dec. 28, 1943

2,338,063

UNITED STATES PATENT OFFICE 2,338,063

METHOD FOR CONVERTING HYDROCARBON OILS

Thomas P. Simpson, John W. Payne, and John A. Crowley, Jr., Woodbury, and Clark S. Teitsworth, Plainfield, N. J., assignors to Socony-Vacuum Oil Company, Incorporated, New York, N. Y., a corporation of New York Application April 13, 1940, Serial No. 329,410

6 Claims. (Cl. 196—52)

This application is a continuation-in-part of our co-pending application Serial Number 308,058, filed December 7, 1939, which in turn is a division of our application Serial Number 162,070, filed September 1, 1937, now U. S. Patent 2,185,930.

The present invention is directed to a method of conducting catalytic reactions or other operations involving the use of a mass of contact material of the type wherein a fluid, for example, a reaction mixture, flows through a stationary contact mass composed of solid particles which may, for example, be a catalyst, a support for a catalyst or the like. The invention is equally applicable to exothermic and endothermic reactions and also regeneration of such contact mass in situ wherein the regeneration is also a reaction of an exothermic or endothermic nature. Our invention is particularly directed to an apparatus for and a method of conducting catalytic hydrocarbon conversion reactions such as cracking, polymerization, desulphurization, etc., and subsequent in situ regeneration of the catalyst used in the conversion reactions.

A particular difficulty in contact mass operations of the kind referred to herein, lies in the proper and effective distribution of heat during reactions. Catalytic reactions of exothermic or endothermic nature must have heat removed or supplied in accordance with their demands, or fail of their purpose. With an exothermic reaction, localized overheating leads to increased localized reaction, resulting in side reactions, undesirable products, sometimes dangerously accelerated reactions, and sometimes destruction of the contact material. With an endothermic reaction, localized reaction creates localized heat demand, which because of the low conductivity of catalyst masses, cannot usually be supplied, resulting in spotty operation, frequently leading to failure of catalytic operation as a whole.

For many operations it may be desirable or necessary to employ a catalyst or other contact material composed of relatively small particles, e. g., 20 or 30 mesh or finer. While certain problems arise in connection with properly distributing and passing gaseous material through any stationary bed of catalyst particles, the use of rather small particles presents a still further difficulty. When a contact mass is composed of very small particles such as 20 or 30 mesh or smaller there are only small gas voids between the particles. Accordingly, it is extremely difficult, even when using high pressures, to force fluid reactants through the mass in a feasible manner. While the present invention is not restricted thereto, it is particularly directed to an apparatus for and a method of conducting catalytic reactions or operations which employ catalysts composed of relatively small particles, e. g., 30–60 mesh particles.

It is an object of this invention to provide a method of conducting fluid-solid contact operations such as catalytic reactions, including regeneration of said catalyst, which avoid the above stated objections, is capable of high thruput per unit of contact or catalyst mass, combines high rates of charge with high yields of desirable product, is capable of efficient and uniform use of all portions of the contact or catalyst mass, is capable of effecting rapid, complete, uniform and readily controlled regeneration of catalyst in situ and is economical in operation as well as simple and flexible.

A more specific object of the present invention is to provide a method of carrying out the above stated object of our invention, wherein a contact or catalyst mass is used composed of relatively small particles and suitable gas passageways are provided through the mass.

The present invention comprises a method of conducting contact or catalytic reactions, including in situ catalyst regeneration, wherein a fluid reactant is passed in a relatively long path through, and in direct contact with, a deep bed of stationary contact or catalyst material composed of solid particles by means of formed passages for the fluid reactant so that no substantial part of such fluid has to force its own way through the closely packed particles or at least not through any portion of particles of substantial extent so as to encounter difficulties, and a properly temperature-controlled fluid heat exchange medium is flowed within sufficiently close indirect heat exchange relationship with every particle in the mass that the temperature of every particle therein may be maintained within a proper operating range without any deleterious temperature occurring.

As has been stated, the method of operation and apparatus herein disclosed are applicable to contact catalytic operations in general. Of these operations, vapor phase cracking of heavy hydrocarbons to gasoline and subsequent in situ regeneration of the cracking catalyst are typical. Therefore, for convenience and simplification, this specification will hereinafter discuss such cracking operation as exemplary, without however, intending to be limited thereby or thereto, except by such limits as may appear in the claims.

For a fuller understanding of the invention, reference is now made to the accompanying drawings which show preferred embodiments of our invention and wherein:

Fig. 1 is a longitudinal section of one form of the apparatus;

Fig. 2 is a perspective view of a portion of the internal structure of Fig. 1;

Fig. 3 is a cross-section of Fig. 1 on line 3—3;

Fig. 4 is a longitudinal section of a portion of an alternate form of apparatus;

Fig. 5 is a cross-section of Fig. 4 on line 5—5;

Fig. 6 is a detailed longitudinal view of a portion of one element of Fig. 4 showing some contact material in place; and, Fig. 7 is an illustration of how the apparatus with which this invention is concerned may be set up and operated for commercial practice of the process to be conducted therein.

The apparatus shown in Fig. 1 consists of a shell 1 lying between body members 2 and 3 and completed at either end by end pieces 4 and 5. Tube plate 6 is placed between members 2 and 4 and tube plate 7 is placed between members 3 and 5. Tubes 8 extend between tube sheets 6 and 7 and are securely fastened into the respective tube sheets by rolling, welding or other form of appropriate fastening. Orifice plate 9 is placed between parts 1 and 2, and the tubes 8 pass through plate 9 without being affixed thereto. Orifice plate 10 is placed similarly between members 1 and 3, and tubes 8 similarly pass through orifice plate 10. The end member 5 is equipped with an inlet fitting 11 and end member 4 is equipped with the outlet fitting 12. Inlet member 13 communicates with the space inside of member 3 between plates 7 and 10 surrounding tubes 8. Outlet member 14 communicates with the space within member 2 between plates 6 and 9 surrounding tubes 8. Orifice plates 9 and 10 are equipped with orifices 15 distributed uniformly over the portion of their area not occupied by passages for tubes 8.

Oil or other reactant entering through inlet 13 will pass through the orifices 15 in plate 10, longitudinally through the space within shell 1, through the orifices 15 in plate 9, and leave the system through fitting 14. A liquid heat exchange fluid may enter through 11, pass through tubes 8 and leave the apparatus through fitting 12 without coming in physical contact with the oil. Tubes 8 are constructed of heat conducting material and therefore permit indirect heat exchange between the oil and heat exchange medium. The direction of flow of fluid may be changed without altering the relationship. The shell 1 serves as the container for a catalytic or contact mass composed of solid particles. This contact mass may be introduced and removed by making use of the opening normally covered by plates 16 and 17.

A most important feature of the present invention is the structure within shell 1 and its function. In order to properly carry out the invention the fluid reactant must pass at a practical rate through, and in direct contact with, the catalyst packed therein, and close and uniform temperature control must be exercised over all portions of the catalyst. Since the invention is particularly directed to operations using catalyst composed of relatively small particles, which pack closely together, provision must be made for reactant paths through the catalyst mass. We prefer to form continuous particle-free passages completely through the catalyst bed which permit the fluid reactant to pass therethrough in direct contact with the particles along at least one edge of the passages; however, the passages may be only substantially continuous allowing the reactant to flow directly through small portions of particles, but such portions should be sufficiently shallow as not to cause any difficulties. Therefore, we have found that the structure of the reaction zone containing the catalyst mass has two principal requirements for carrying out our present invention, namely, suitable passage means for circulating fluid heat exchange medium and suitable baffle means for defining reactant paths through the catalyst mass and aiding in heat transfer.

Several structural means may be devised whereby the above requirements of the reaction zone may be provided. A particularly convenient and inexpensive means is shown in Figs. 1 to 3. In this arrangement there are shown the heat exchange medium carrying tubes 8 and between these tubes are shown various short pieces of light angle iron 18. These pieces of angle iron are so arranged that their length is placed horizontally and their angle is open downwardly. Placed in this manner between the heat exchange tubes 8, each layer of angle irons 18 being disposed transversely to those on the layer below, each angle iron serves to receive and re-distribute ascending oil, air or other reactant.

To prevent the reactant flow being concentrated at the end of the angle irons against the walls of the chamber, each angle iron is pierced at several points along its heel, forming series of orifices 19, these orifices being so located that those in one angle iron will be directly below the closed part of the next above angle iron which crosses over this part of the first mentioned angle iron. In this manner each orifice distributes reactant into the space beneath the closed part of angle iron above it, so that reactant cannot pass directly upward through another orifice. In short, this arrangement is such that these orifices when assembled are not in register. It will be seen that by this arrangement the reactant passes in a tortuous path up through the chamber through continuous substantially particle-free passages but that the reactant is in direct contact with the catalyst particles along the lower boundaries of the passages. The result of this arrangement is an effective contacting of the catalyst and reactant while providing suitable passageway for the reactant through the particles, coupled with an effective temperature control of all of the particles.

As stated above several structure means may be devised for effecting the desired baffling in order to provide proper passages for the reactant through the catalyst mass. In Figs. 4 to 6 we show another baffle structure comprising winding fins of heat conducting material which may be used in place of the angle iron baffles shown in Figs. 1 to 3. In fact the fin baffles of Fig. 4 have certain advantages over the angle irons in that being welded to the tubes, they give greater heat exchange surface to the tubes themselves and moreover, this fin structure has certain advantages from a construction standpoint.

In Fig. 4 heat exchange tubes 8 are provided in a manner similar to that shown in Figs. 1 to 3 but instead of placing angle irons between the tubes, a metal fin 20 is welded to each tube, the fin being wound continuously along the tube as shown. It will be seen in Fig. 5 that the external peripheries of the fins 20 of adjacent tubes are in vertical alignment. From what we have disclosed herein, it will be apparent that for best results these fins should be either so arranged or actually over-lapping. In other words, there should not be any substantial cross area in the reaction zone above and below which in a straight vertical line through the length of the zone there is no baffling, since otherwise a substantial amount of reactant would have an unaided "sweep" through this unbaffled area, and the clay in the center of this area might not be kept sufficiently close to the heat exchange surface. Of course, there might be a slight amount of this vertically free area before appreciable inferior results are encountered.

The object of having the fins wound along each tube is to provide, winding, substantially continuous particle-free gas or vapor passageways underneath each fin up through the catalyst mass. While we show uniform helical fins, the fins might have any suitable construction which accomplishes this object. In operation the catalyst mass substantially fills the reaction zone forming an outer side wall to the gas or vapor passageways underneath the fins whereby the gaseous agent and catalyst are in direct contact. A further feature may be provided by using baffles of mesh wire construction, the mesh of which is too fine to permit passage of particles, and thereby the reacting surface of the zone is practically doubled, since the reaction not only occurs along the above mentioned outer side wall but also along the face of the fin baffles. (See Fig. 6.)

In Fig. 7 showing a typical operating setup for commercial practice of this invention for vapor phase cracking of petroleum, 21 is a heater, 22 a vapor separator, 23 and 24 are catalyst cases, 25 is a fractionator for treatment of processed vapors, 26 a condenser, and 27 a gas separator. Charge stock enters the system through pump 28, and, by means of the manifold arrangement shown, any portion of it may be passed through heat exchangers 29 and 30 in any sequence desired, to be later collected in pipe 31 and passed through furnace heater 21 and into vapor separator 22, where a vaporous charge for the catalytic process, substantially free from liquid and materials of unduly high boiling point, is prepared. In case the charge stock selected is wholly vaporous at the desired reaction temperatures, the vapor separator may be dispensed with. Any liquid separated in 22 may be removed from the system by pipe 32.

Vapors from 22 pass through pipe 33, and if catalyst case 23 be "on stream," through pipe 34 into case 23, the valve in pipe 35 being closed. Passing through catalyst case 23, the treated reaction mixture leaves through pipe 36, pipe 37 being closed, and through pipe 38 to fractionator 25. Material heavier than desired product is condensed in 25 and withdrawn through pipe 39 to storage, or it may be recycled in company with charge, or it may be retreated in another step of catalytic or thermal conversion. Product vapors leaving 25 through pipe 40 are condensed in 26, and separated from uncondensible gas in 27.

While catalyst case 23 is "on stream," catalyst case 24 will be regenerating. Regeneration medium (in this operation air is used), is supplied by compressor 41, and passed through pipe 42 into case 24. Regeneration gases, leaving case 24 by pipe 43, may pass either through cooler 44 or through cooler 30 and after recovery of heat therefrom, are discharged to the atmosphere. Cooler 44 may be water cooled, or may be a waste heat boiler, or may heat charge for other processes, and any suitable division of flow through these two cooling means may be used. Fluid heat transfer medium is supplied under pressure by pump 45 to discharge manifold 46, from which any desired disposal may be made to the tubes in cases 23 and 24, the transfer medium, recollected in manifold 47 being passed through cooler 29 (or a suitable heater if necessary) before return to the pump.

In the usual case, in the setup shown in Fig. 7, the heat transfer medium is cooled to a temperature somewhat above the reaction temperature in case 23, and a sufficient volume is passed through case 23 to supply endothermic reaction heat and at the same time insure even distribution of reaction therein. Another portion is passed through case 24, sufficient in amount to control distribution of the exothermic regeneration reaction therein, to remove excess reaction heat therefrom and to supply kindling heat to the incoming regeneration air.

At the end of regeneration, air from pipe 42 is shut off, steam is admitted to case 24 through connection 48, and regeneration medium and products are steamed out through regeneration gas disposal means. When case 23 comes "off stream" it is steamed out to the vapor system by steam admitted through connection 49. Then case 24 is put "on stream" and case 23 is regenerated.

An important feature of the present invention is the use of fluid heat exchange medium and the structure whereby the solids are directly contacted with gaseous agent while each particle of the solids is within sufficiently close proximity to the heat exchange medium that no deleterious temperature condition occurs.

In order to obtain proper temperature control the heat exchange medium must be adjusted to the proper temperature for extracting or adding the necessary heat. Moreover, such heat exchange medium must be flowed in sufficient amount in close direct heat exchange with every solid particle and cooled or heated to readjust its temperature by means extraneous for the reaction heat before the medium's temperature reaches an undesired value. In this way the heat exchange medium in our invention continuously controls the temperature of the zone making immediate compensations for temperature changes whereby no deleterious temperatures occur.

While temperature-controlled, circulating gaseous heat exchange mediums of high specific heat might be used in some instances, we greatly prefer the use of liquid heat exchange mediums since necessary pumping and pressure facilities for proper use of even the best gaseous mediums, e. g., hydrogen, would, in many instances, render the operation commercially impractical.

The liquid heat exchange medium to be used is preferably one which at the temperatures encountered is possessed of a low vapor pressure, a high specific heat, a suitable viscosity and is not corrosive to the usual metals and other materials which may be used in construction of the apparatus. Many normally solid materials in their fused state form excellent heat exchange mediums such as fused salts and fused metals and alloys. In the regeneration of clay cracking catalysts, we prefer the use of fused salts. A particularly preferable mixture of this kind is a mixture of the alkali metal salts of nitric and nitrous acids. In certain cases suitable liquid heat exchange media might be found which have a boiling point around the desired operating temperature, in which case, the heat exchange medium, although mostly in the liquid state, might undergo some transition whereby advantage could be taken of its heat of vaporization or condensation. By the use of liquid heat exchange media and by having them in sufficiently close proximity to all particles undergoing reaction an extremely close and uniform temperature control may be maintained.

In the preferred practice the heat exchange medium is maintained at substantially the temperature of the treatment being controlled, e. g., above the minimum temperature at which proper treating is obtained and below the minimum temperature at which undesirable heat injuries occur such as substantial damage to the particles or reaction. Such practice may be carried out effectively when the heat exchange medium is a liquid and has a relatively high specific heat and the structure of the apparatus is such that heat exchange medium is brought within close proximity to every particle in the apparatus. Hence considerable fluctuations in temperature in either direction can be compensated by the liquid heat exchange medium without substantially altering its temperature and suitable cooling or heating of the heat exchange medium in its circuit maintains the liquid at the treating temperature. Thus if a sharp brief rise in temperature occurs which normally would damage the catalyst before it is indicated, if ever, on a temperature responsive device and suitable manipulation effected to offset the rise, in the present method the liquid heat exchange medium would immediately and automatically offset the rise by absorbing any excess heat so that deleterious temperatures would not be created. Likewise if the temperature fell off sharply so that normally the temperature would go so low that inefficient regeneration would result, this fluctuation likewise would be immediately and automatically offset by the liquid heat exchange medium which would add heat to the cooling particles. A further advantage in this practice results from the complicated structure of apparatus for affording proper temperature control. The structure involves an exposure of large amounts of heat conducting walls. When two widely different temperatures are maintained on different sides of these walls thermal expansion difficulties may arise causing buckling, etc. However when substantially the same temperature is maintained throughout, the apparatus operates without strain or difficulty.

As has been indicated hereinabove one of the important features of the present invention is the provision of a reaction zone wherein a temperature controlled liquid heat exchange medium is circulated in indirect heat exchange within close proximity to every catalyst particle in the zone so that a proper temperature can be maintained without anw deleterious temperature occurring. Obviously this maximum distance that each catalyst particle might be from the liquid heat exchange medium may vary with the catalyst treated, the atmosphere in the reaction zone, the amount and nature of impurities being removed when regenerating, mass velocity of gaseous agent, physical properties of the liquid heat exchange medium, etc. Accordingly it would be difficult to specify one maximum distance that may be used for every operation, however, in general, this maximum distance should not exceed about 1 to 1½ inches. A maximum distance of about ¼ to ½ inch seems to be well suited for regenerating clay cracking catalysts.

Furthermore it has been found that the hydraulic radius (i. e., cross area not occupied by heat exchange equipment measured in square inches divided by perimeter or length of heat transfer surface in that area measured in inches) at all points along the regenerating portion of the case should be below about 0.5 inch and preferably for regenerating cracking catalysts should be around 0.4 to 0.2 inch or lower.

In the regeneration of clay cracking catalysts, the rate of burning should be such that the regenerating temperature will not exceed about 1050° F. under the conditions of operations and will remove coke at the rate of about 1% by weight of catalyst to about 10% per hour for a broad range of possible operation and from about 3% to 6% for preferred operation. The mass velocity of heat exchange medium of course depends upon the specific heat and other characteristics of the medium. It is best defined as that mass velocity of heat exchange medium which will extract the required amount of heat while undergoing a temperature rise of not more than about 50° F. and preferably of from 2° to 10° F.

The catalytic reaction for conversion of heavier oils to gasoline is preferably conducted under a gauge pressure not substantially in excess of 30 to 40 pounds per square inch. Rates of coke deposition per unit yield increase rapidly with increases in pressure, and the preferred operation is at pressures ranging from atmospheric upwards to about 20 pounds per square inch gauge. Under these conditions, it is necessary to recompress fixed gases yielded by the process in order to introduce them to the customary vapor recovery operations, but this cost is more than regained by lower cost of regeneration. With stocks tending to form very little coke, pressure may be raised to the range 30 to 40 pounds gauge and recompression of gases avoided without sacrifice of good regeneration conditions.

The catalytic reaction for conversion of other oils to gasoline may be conducted at temperatures in the catalyst mass between about 810° F. and about 950° F. and preferably between 825° F. and 900° F. The rate of charge for such conversion will usually be in excess of twenty liters of liquid charge per hour per twenty liters of catalyst mass, and should preferably be at least fifty liters liquid charge per hour per twenty liters of catalyst. Such rates of charge and temperatures, using a charge which is clean, i. e., substantially free of unvaporized particles of high boiling oils and the like, prone to heavy coke formation, should result in a coke deposit amounting to from about 0.1% to about 2.0% by weight of the catalyst (average condition throughout the case), and under the preferable ranges of operation, from 0.2% to 1.5% by weight of catalyst.

The regeneration operation should be conducted by the introduction of air under pressures very slightly above atmospheric, sufficient only to insure flow through the apparatus at the requisite rates. The temperature of regeneration should range from about 825° F. to about 1000° F. Preferred operation is at about 900° F. and, with a clay type catalyst, 1050° F. should not be exceeded due to possibility of rapid catalyst deterioration above those temperatures. The rate.

of air introduction should be such that the proper temperatures are maintained while burning off coke at a rate of from about 1% by weight of catalyst to about 10% per hour, the preferred burn-off being from 3 to 6% per hour. Under these conditions the carbon dioxide in the resulting fume will range from about 3% to about 12%, the preferred range being from 6% to 11%.

It is understood that the exemplary and numerical data herein given are set forth largely for the purposes of illustration and that the invention is not limited thereby except as such limitations are expressed in the claims.

We claim:

1. In a process of effecting the catalytic cracking of heavier petroleum hydrocarbons to high-quality gasoline by flowing vapors of the heavier hydrocarbons through a substantial portion of a stationary bed of solid catalyst particles that are not substantially larger than 30–60 mesh and wherein the bed is of substantial depth, the improvement which comprises forming a plurality of tortuous gaseous passages in the catalyst bed which are predominantly open to the catalyst particles and which are substantially continuous and substantially free of said particles for the portion of the bed contacted by the gas so that the gas may pass through a substantial portion of the bed in direct contact with the particles but without forcing its way through any substantial area of closely packed particles, passing substantially all the vapors of said heavier hydrocarbons through said formed passages under cracking conditions, continuing such passage of higher hydrocarbons until sufficient carbonaceous matter is deposited upon the catalyst that regeneration of the catalyst is desirable, removing fluid hydrocarbons from contact with the catalyst, passing air through said formed passages in the catalyst bed under combustion-supporting conditions, and flowing a molten salt heat exchange medium during regeneration within sufficiently close indirect heat exchange with every catalyst particle in the bed to maintain its temperature within a range not exceeding the minimum temperature at which the burning of carbonaceous deposit occurs and a maximum temperature above which substantial damage to the catalyst occurs, said heat exchange medium being maintained at a temperature substantially between the minimum temperature of cracking and the maximum temperature of regeneration.

2. In a process of effecting the catalytic cracking of heavier petroleum hydrocarbons to high-quality gasoline by flowing vapors of the heavier hydrocarbons through a substantial portion of a stationary bed of solid catalyst particles that are not substantially larger than 20 mesh and wherein the bed is of substantial depth, the improvement which comprises forming a plurality of tortuous gaseous passages in the catalyst bed which are predominantly open to the catalyst particles and which are substantially continuous and substantially free of said particles for the portion of the bed contacted by the gas so that the gas may pass through a substantial portion of the bed in direct contact with the particles but without forcing its way through any substantial area of closely packed particles, passing substantially all the vapors of said heavier hydrocarbons through said formed passages under cracking conditions, continuing such passage of higher hydrocarbons until sufficient carbonaceous matter is deposited upon the catalyst that regeneration of the catalyst is desirable, removing fluid hydrocarbons from contact with the catalyst, passing air through said formed passages in the catalyst bed under combustion-supporting conditions, and flowing a fluid heat exchange medium during regeneration within sufficiently close indirect heat exchange with every catalyst particle in the bed to maintain its temperature within a range not exceeding the minimum temperature at which the burning of carbonaceous deposit occurs and a maximum temperature above which substantial damage to the catalyst occurs, said heat exchange medium being maintained at a temperature substantially between the minimum temperature of cracking and the maximum temperature of regeneration.

3. In a process of effecting the catalytic conversion of petroleum hydrocarbons to high-quality gasoline by flowing vapors of the hydrocarbons through a substantial portion of a stationary bed of solid catalyst particles that are not substantially larger than 20 mesh and wherein the bed is of substantial depth, the improvement which comprises forming a plurality of tortuous gaseous passages in the catalyst bed which are predominantly open to the catalyst particles and which are substantially continuous and substantially free of said particles for the portion of the bed contacted by the gas so that the gas may pass through a substantial portion of the bed in direct contact with the particles but without forcing its way through any substantial area of closely packed particles, passing substantially all the vapors of said hydrocarbons through said formed passages under conversion conditions, continuing such passage of hydrocarbon vapors until sufficient carbonaceous matter is deposited upon the catalyst that regeneration of the catalyst is desirable, removing fluid hydrocarbons from contact with the catalyst, passing air through said formed passages in the catalyst bed under combustion-supporting conditions, and flowing a liquid heat exchange medium during regeneration within sufficiently close indirect heat exchange with every catalyst particle in the bed to maintain its temperature within a range not exceeding the minimum temperature at which the burning of carbonaceous deposit occurs and a maximum temperature above which substantial damage to the catalyst occurs, said heat exchange medium being maintained at a temperature substantially between the minimum temperature of cracking and the maximum temperature of regeneration.

4. In a process of effecting the catalytic conversion of petroleum hydrocarbons to high-quality gasoline by flowing vapors of the hydrocarbons through a substantial portion of a stationary bed of solid catalyst particles of substantial depth, the improvement which comprises forming a plurality of tortuous gaseous passages in the catalyst bed which are predominantly open to the catalyst particles and which are substantially continuous and substantially free of said particles for the portion of the bed contacted by the gas so that the gas may pass through a substantial portion of the bed in direct contact with the particles but without forcing its way through any substantial area of closely packed particles, passing substantially all the vapors of said hydrocarbons through said formed passages under conversion conditions, continuing such passage of hydrocarbon vapors until sufficient carbonaceous matter is deposited upon the catalyst that regeneration of the catalyst is desirable, removing fluid hydrocarbons from contact with the catalyst, passing air through said formed passages in the catalyst bed under combustion-supporting conditions, and flowing a temperature-controlled fluid heat exchange medium during regeneration within sufficiently close indirect heat exchange with every catalyst particle in the bed to maintain its temperature within a range not exceeding the minimum temperature at which the burning of carbonaceous deposit occurs and a maximum temperature above which substantial damage to the catalyst occurs.

5. In a process wherein a contact mass of solid particles is contacted with a gaseous material by flowing the gas through a substantial portion of a stationary bed of solid contact particles that are not substantially larger than 30–60 mesh and wherein the bed is of substantial depth, the improvement which comprises forming a plurality of tortuous gaseous passages in the bed of contact material which are predominantly open to the contact particles and which are substantially continuous and substantially free of said particles for the portion of the bed contacted by the gas so that the gas may pass through a substantial portion of the bed in direct contact with the particles but without forcing its way through any substantial area of closely packed particles, passing substantially all the gaseous material through said formed passages in direct contact with the particles, and flowing a temperature-controlled fluid heat exchange medium within close indirect heat exchange with every particle of contact material in the bed.

6. In a process wherein a contact mass of solid particles is contacted with a gaseous material by flowing the gas through a substantial portion of a stationary bed of solid contact particles of substantial depth, the improvement which comprises forming a plurality of tortuous gaseous passages in the bed of contact material which are predominantly open to the contact particles and which are substantially continuous and substantially free of said particles for the portion of the bed contacted by the gas so that the gas may pass through a substantial portion of the bed in direct contact with the particles but without forcing its way through any substantial area of closely packed particles, and passing substantially all the gaseous material through said formed passages in direct contact with the particles.

THOMAS P. SIMPSON.
JOHN W. PAYNE.
JOHN A. CROWLEY, Jr.
CLARK S. TEITSWORTH.